(12) United States Patent
Niemi et al.

(10) Patent No.: US 12,238,626 B2
(45) Date of Patent: Feb. 25, 2025

(54) ENHANCEMENTS ON EMERGENCY CALL HANDLING DURING A DE-REGISTRATION OR DETACH PROCEDURE

(71) Applicant: MediaTek Singapore Pte. Ltd., Singapore (SG)

(72) Inventors: Marko Niemi, Oulu (FI); Matti Moisanen, Oulu (FI)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 324 days.

(21) Appl. No.: 17/678,255

(22) Filed: Feb. 23, 2022

(65) Prior Publication Data

US 2022/0312171 A1  Sep. 29, 2022

Related U.S. Application Data

(60) Provisional application No. 63/166,274, filed on Mar. 26, 2021.

(51) Int. Cl.
*H04W 4/90* (2018.01)
*H04W 60/06* (2009.01)

(52) U.S. Cl.
CPC ............ *H04W 4/90* (2018.02); *H04W 60/06* (2013.01)

(58) Field of Classification Search
CPC ..... H04W 60/06; H04W 76/30; H04W 76/10; H04W 60/04
USPC ...................................................... 455/404.1
See application file for complete search history.

(56) References Cited

U.S. PATENT DOCUMENTS

| 2012/0094627 | A1* | 4/2012 | Suh | H04W 60/04 455/404.1 |
| 2012/0182912 | A1* | 7/2012 | Watfa | H04W 68/12 370/328 |
| 2020/0028920 | A1* | 1/2020 | Livanos | H04W 8/26 |
| 2021/0282084 | A1* | 9/2021 | Catovic | H04W 8/26 |

FOREIGN PATENT DOCUMENTS

| WO | 2016/060471 A1 | 4/2016 | |
| WO | WO-2016174512 | * 11/2016 | ............ H04W 60/06 |

OTHER PUBLICATIONS

Chinese language office action dated May 26, 2022, issued in application No. TW 111110441.

* cited by examiner

*Primary Examiner* — Maria El-Zoobi
(74) *Attorney, Agent, or Firm* — McClure, Qualey & Rodack, LLP

(57) ABSTRACT

A method executed by a User Equipment (UE) for emergency call handling during a de-registration or detach procedure is provided. The UE initiates a Mobility Management (MM) de-registration procedure or an MM detach procedure with a mobile communication network. The UE initiates an emergency service before the MM de-registration procedure or the MM detach procedure has been completed. In response to the initiation of the emergency call, the UE aborts the MM de-registration procedure or the MM detach procedure and performs local de-registration or local detach. After the local de-registration or the local detach, the UE initiates a registration procedure or an attach procedure.

17 Claims, 5 Drawing Sheets

ENHANCEMENTS ON EMERGENCY CALL HANDLING DURING A DE-REGISTRATION OR DETACH PROCEDURE

CROSS REFERENCE TO RELATED APPLICATIONS

This application claims priority under 35 U.S.C. § 119 from U.S. Provisional Application No. 63/166,274, entitled "Emergency call handling during deregistration", filed on Mar. 26, 2021, the subject matter of which is incorporated herein by reference.

BACKGROUND OF THE APPLICATION

Field of the Application

The application generally relates to mobile communications, and more particularly, to enhancements on emergency call handling during a de-registration or detach procedure.

Description of the Related Art

In a typical mobile communication environment, a UE (also called a Mobile Station (MS)), such as a mobile telephone (also known as a cellular or cell phone), or a tablet Personal Computer (PC) with wireless communication capability may communicate voice and/or data signals with one or more mobile communication networks. The wireless communication between the UE and the mobile communication networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, etc. In particular, GSM/GPRS/EDGE technology is also called 2G technology; WCDMA/CDMA-2000/TD-SCDMA technology is also called 3G technology; and LTE/LTE-A/TD-LTE technology is also called 4G technology.

These RAT technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the 3rd Generation Partnership Project (3GPP). It is designed to better support mobile broadband Internet access by improving spectral efficiency, reducing costs, and improving services.

According to the 3GPP specifications and/or requirements in compliance with the 2G/3G/4G/5G technology, when a 5G Mobility Management (5GMM) procedure (e.g., a 5GMM de-registration procedure) or an MM, GPRS MM (GMM), or Evolved Packet System (EPS) MM (EMM) procedure (e.g., an MM/GMM/EMM detach procedure) is ongoing, other 5GMM or MM/GMM/EMM specific procedures cannot be started. That is, if a UE wishes to make an emergency call during an ongoing 5GMM de-registration procedure or MM/GMM/EMM detach procedure, then the UE has to wait for the 5GMM de-registration procedure or MM/GMM/EMM detach procedure to complete, so that it can (re-)register with a network to make the emergency call. However, the 5GMM de-registration procedure or MM/GMM/EMM detach procedure may fail for various reasons (e.g., the network coverage is getting weak, or the Radio Resource Control (RRC) connection is failing), and the 5GMM de-registration procedure or MM/GMM/EMM detach procedure may last as long as 75 seconds before the UE considers it to have failed and moves on with the registration procedure for call setup. As a result, the call may be delayed and user experience will be bad.

BRIEF SUMMARY OF THE APPLICATION

In order to solve the aforementioned problem, the present application proposes to advance the call setup process by allowing the UE to abort the MM (e.g., 5GMM in 5G NR) de-registration procedure or the MM (e.g., MM in 2G, GMM in 3G, or EMM in 4G) detach procedure and to perform local de-registration or local detach. Once the local de-registration or the local detach is completed, the UE may initiate a registration procedure or an attach procedure and make the call. On the other hand, the present application proposes that the mobile communication network shall abort the ongoing MM de-registration procedure or MM detach procedure and process the registration request received before the ongoing MM de-registration procedure or MM detach procedure has been completed. Advantageously, the call setup time will be reduced significantly and the user experience will be improved.

In one aspect of the application, a method executed by a UE is provided. The method comprises the following steps: initiating an MM de-registration procedure or an MM detach procedure with a mobile communication network; initiating an emergency service before the MM de-registration procedure or the MM detach procedure has been completed; aborting the MM de-registration procedure or the MM detach procedure and performing local de-registration or local detach in response to the initiation of the emergency call; and initiating a registration procedure or an attach procedure after the local de-registration or the local detach.

In another aspect of the application, a UE comprising a wireless transceiver and a controller is provided. The wireless transceiver is configured to perform wireless transmission and reception to and from a mobile communication network. The controller is configured to initiate a MM de-registration procedure or an MM detach procedure with the mobile communication network, initiate an emergency service before the MM de-registration procedure or the MM detach procedure has been completed, abort the MM de-registration procedure or the MM detach procedure and perform local de-registration or local detach in response to the initiation of the emergency call, and initiate a registration procedure or an attach procedure after the local de-registration or the local detach.

In one example, the MM de-registration procedure or the MM detach procedure is initiated not due to the UE being switched off.

In one example, the local de-registration or the local detach comprises: locally releasing a Radio Resource Control (RRC) connection or a Radio Resource (RR) connection.

In one example, the UE further performs at least one of the following in response to the initiation of the emergency call: (1) determining a cell on which the UE is currently camping as barred; and (2) enabling the emergency service to be attempted in another mobile communication network which is an IP-Connectivity Access Network (IP-CAN) or a Circuit-Switched (CS) domain network.

In one example, the UE further starts a timer upon the initiation of the MM de-registration procedure or the MM detach procedure, wherein the emergency service is initiated when the timer is running, and the abortion of the MM de-registration procedure or the MM detach procedure is performed at expiry of the timer. The UE may set a counter of de-registration attempts to a value denoting that the next expiry of the timer is the fifth expiry. The timer may be a timer T3521 in response to the mobile communication network being a 5GS, or may be a timer T3421 in response to the mobile communication network being an EPS (i.e., a 4G system), or is a timer T3321 in response to the mobile communication network being a 2G/3G system.

In one example, the emergency service is an emergency call which requests an emergency service fallback or a Circuit Switched Fallback (CSFB), or requests establishment of an emergency Protocol Data Unit (PDU) session or an emergency Packet Data Network (PDN) connection.

In one example, the MM de-registration procedure is initiated in response to the mobile communication network being a 5GS.

In one example, the MM detach procedure is initiated in response to the mobile communication network being a 2G/3G/4G system.

In yet another aspect of the application, a method executed by a mobile communication network is provided. The method comprises the following steps: processing an MM de-registration procedure or an MM detach procedure initiated by a UE; receiving a Non-Access Stratum (NAS) message for initiating an emergency service from the UE before the MM de-registration procedure or the MM detach procedure has been completed; and aborting the MM de-registration procedure or the MM detach procedure to process the initiation of the emergency service.

In one example, the NAS message is a REGISTRATION REQUEST message comprising a 5GS registration type Information Element (IE) which indicates initial registration or emergency registration.

In one example, the NAS message is an ATTACH REQUEST message comprising an EPS attach type IE which indicates EPS attach, combined EPS/IMSI attach, or EPS emergency attach, or comprising an attach type IE which indicates GPRS attach, combined GPRS/IMSI attach, or emergency attach.

In one example, the MM de-registration procedure is initiated in response to the mobile communication network being a 5GS.

In one example, the MM detach procedure is initiated in response to the mobile communication network being a 2G/3G/4G system.

Other aspects and features of the present application will become apparent to those with ordinary skill in the art upon review of the following descriptions of specific embodiments of the methods and UEs for emergency call handling during a de-registration or detach procedure.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
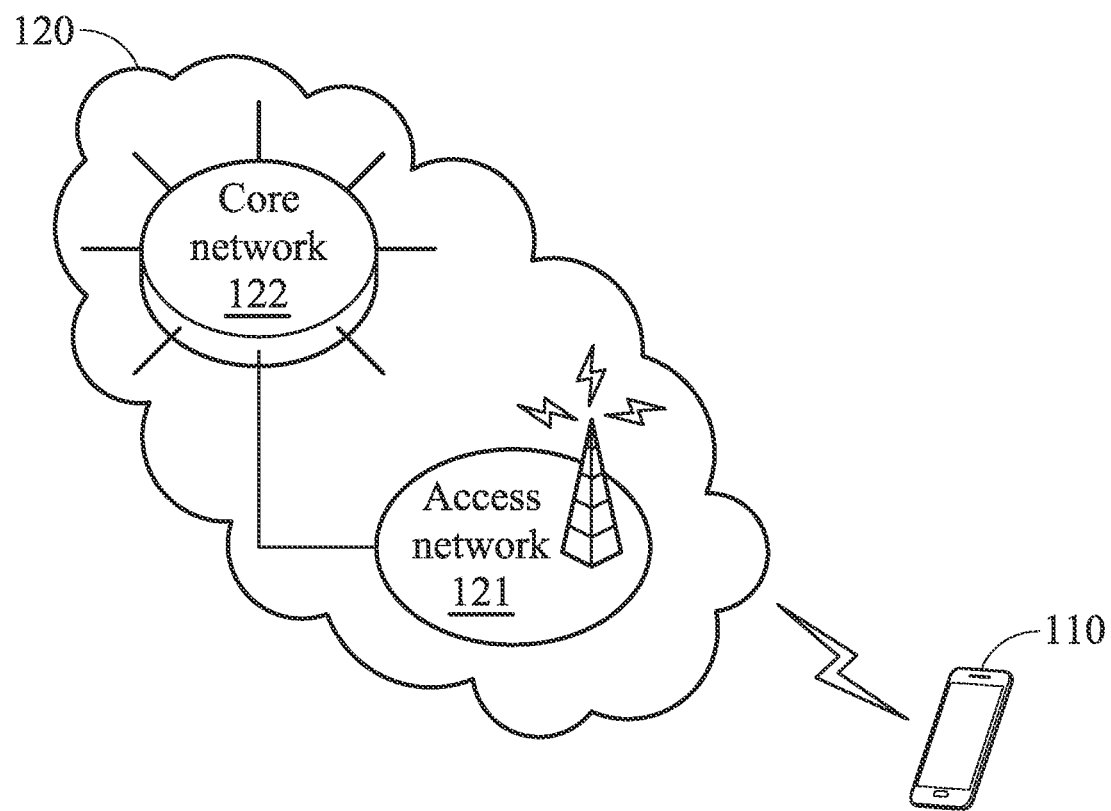
FIG. 1 is a block diagram of a mobile communication environment according to an embodiment of the application.

FIG. 1 is a block diagram of a mobile communication environment according to an embodiment of the application.

The mobile communication environment 100 may include a User Equipment (UE) 110 and a mobile communication network 120, wherein the UE 110 may wirelessly connect to the mobile communication network 120 to obtain mobile services (e.g., voice and/or data services).

The UE 110 may be a feature phone, a smartphone, a panel Personal Computer (PC), a laptop computer, a Machine Type Communication (MTC) device, or any wireless communication device supporting the RAT utilized by the mobile communication network 120.

The mobile communication network 120 may include an access network 121 and a core network 122. The access network 121 is responsible for processing radio signals, terminating radio protocols, and connecting the UE 110 with the core network 122. The core network 122 is responsible for performing mobility management, network-side authentication, and interfaces with public/external networks (e.g., the Internet). The access network 121 and the core network 122 may each comprise one or more network nodes for carrying out said functions.

In one embodiment, the mobile communication network 120 is a 5G network (e.g., an NR network), and the access network 121 and the core network 122 are a Next Generation Radio Access Network (NG-RAN) and a Next Generation Core Network (NG-CN) (i.e., 5G Core Network (5GC)), respectively.

The NG-RAN may include one or more gNBs. Each gNB may further include one or more Transmission Reception Points (TRPs), and each gNB or TRP may be referred to as a 5G cellular station forming one or more cells. Some gNB functions may be distributed across different TRPs, while others may be centralized, leaving the flexibility and scope of specific deployments to fulfill the requirements for specific cases.

The NG-CN may support various network functions, including an Access and Mobility Management Function (AMF), a Session Management Function (SMF), a User Plane Function (UPF), a Policy Control Function (PCF), an Application Function (AF), and an Authentication Server Function (AUSF), wherein each network function may be implemented as a network element on dedicated hardware, or as a software instance running on dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

In another embodiment, the mobile communication network 120 is a 4G network (e.g., an LTE/LTE-A/TD-LTE network), and the access network 121 and the core network 122 are an Evolved-Universal Terrestrial Radio Access Network (E-UTRAN) and an Evolved Packet Core (EPC), respectively. The E-UTRAN may include at least an evolved NB (eNB) (e.g., a macro eNB, femto eNB, or pico eNB). The EPC may include a Home Subscriber Server (HSS), Mobility Management Entity (MME), Serving Gateway (S-GW), Packet Data Network Gateway (PDN-GW or P-GW), and IP Multimedia Subsystem (IMS) server.

In another embodiment, if the mobile communication network 120 is a 3G network (e.g., a WCDMA network), the access network 121 is a UTRAN which includes at least one Radio Network Subsystem (RNS) and one Node-B, and the core network 122 is a GPRS core which includes at least a Mobile Switching Center (MSC), Home Location Register (HLR), Serving GPRS Support Node (SGSN), and Gateway GPRS Support Node (GGSN).

In another embodiment, if the mobile communication network 120 is a 2G network (e.g., a GSM/GPRS/EDGE network), the access network 121 is a GSM EDGE Radio Access Network (GERAN) which includes at least a Base Transceiver Station (BTS) and a Base Station Controller (BSC), and the core network 122 may be a GPRS core.

In accordance with one novel aspect, the UE is capable of aborting the ongoing 5GMM de-registration procedure or MM/GMM/EMM detach procedure and performing local de-registration or local detach, when detecting that an emergency service is initiated before the 5GMM de-registration procedure or MM/GMM/EMM detach procedure has been completed. Once the local de-registration or the local detach is completed, the UE may initiate a registration procedure or an attach procedure and make the call. On the other hand, the mobile communication network 120 is capable of aborting the ongoing 5GMM de-registration procedure or MM/GMM/EMM detach procedure and processing the registration request received before the ongoing 5GMM de-registration procedure or MM/GMM/EMM detach procedure has been completed. Advantageously, the call setup time will be reduced significantly and the user experience will be improved.

Figure 2:
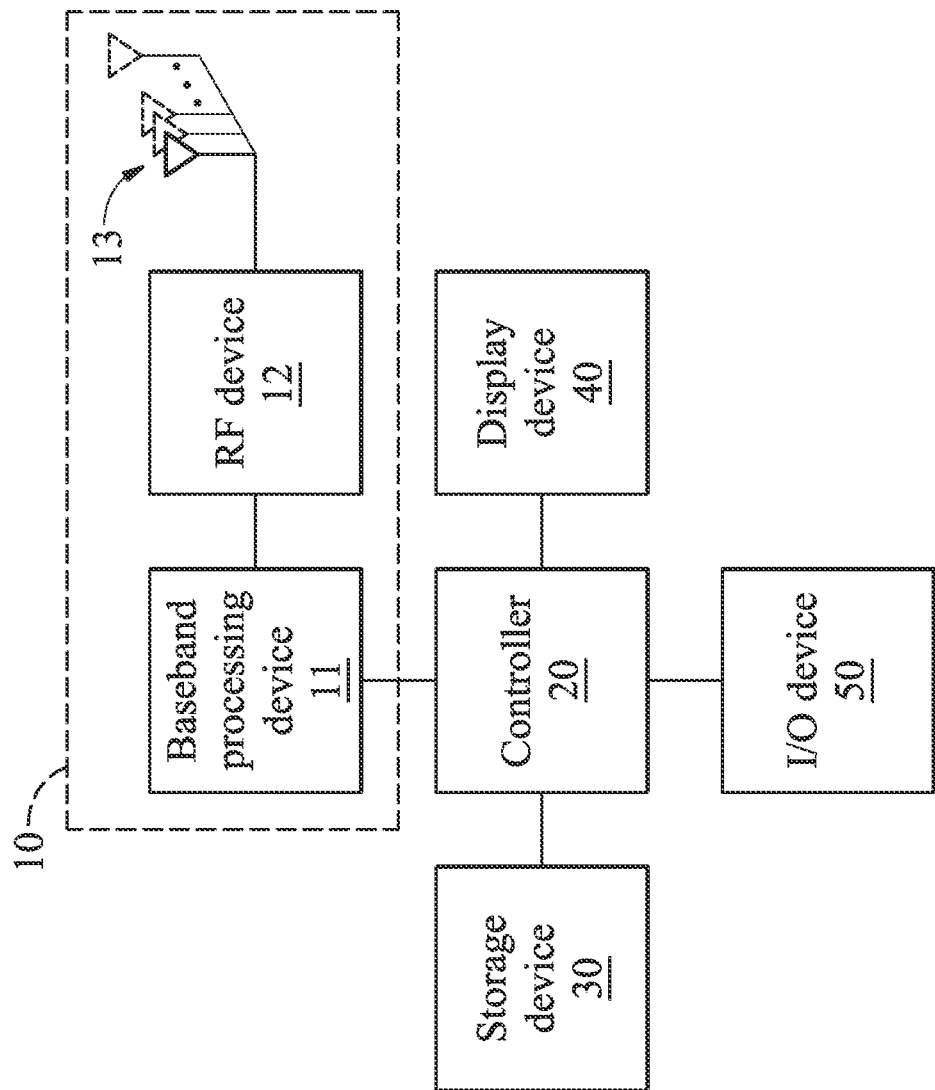
FIG. 2 is a block diagram illustrating a UE according to an embodiment of the application.

FIG. 2 is a block diagram illustrating a UE according to an embodiment of the application.

As shown in FIG. 2, a UE (e.g., the UE 110) may include a wireless transceiver 10, a controller 20, a storage device 30, a display device 40, and an Input/Output (I/O) device 50.

The wireless transceiver 10 is configured to perform wireless transmission and reception to and from the mobile communication network 120. Specifically, the wireless transceiver 10 may include a baseband processing device 11, a Radio Frequency (RF) device 12, and an antenna 13, wherein the antenna 13 may include an antenna array for beamforming.

The baseband processing device 11 is configured to perform baseband signal processing. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may comprise a mixer to multiply the baseband signals with a carrier oscillated in the radio frequency of the supported RAT(s), wherein the radio frequency may be any radio frequency (e.g., 30 GHz-300 GHz for mmWave) utilized in the 5G NR technology, or may be 900 MHz, 2100 MHz, or 2.6 GHz utilized in LTE/LTE-A/TD-LTE technology, or may be 900 MHz, 1900 MHz or 2100 MHz utilized in WCDMA technology, or may be 900 MHz, 1800 MHz or 1900 MHz utilized in GSM/GPRS/EDGE technology, or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communication with the mobile communication network 120, storing and retrieving data to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 to perform the method of the present application.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a SIM/USIM, a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, communication protocols, and/or the method of the present application. In particular, the method of the present application may be implemented as part of a communication protocol, e.g., a 2G/3G/4G/5G protocol stack. For example, the method of the present application may be implemented in the 5GMM layer of a 5G protocol stack, or in the EMM layer of a 4G protocol stack, or in the GMM layer of a 3G protocol stack, or in the MM layer of a 2G protocol stack.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application. For example, a UE may include more components if necessary, such as a power supply, and/or a Global Positioning System (GPS) device, wherein the power supply may be a mobile/replaceable battery providing power to all the other components of the UE, and the GPS device may provide the location information of the UE for use by some location-based services or applications. Alternatively, a UE may include fewer components if necessary. For example, a UE may not include the display device 40 and/or the I/O device 50.

Figure 3:
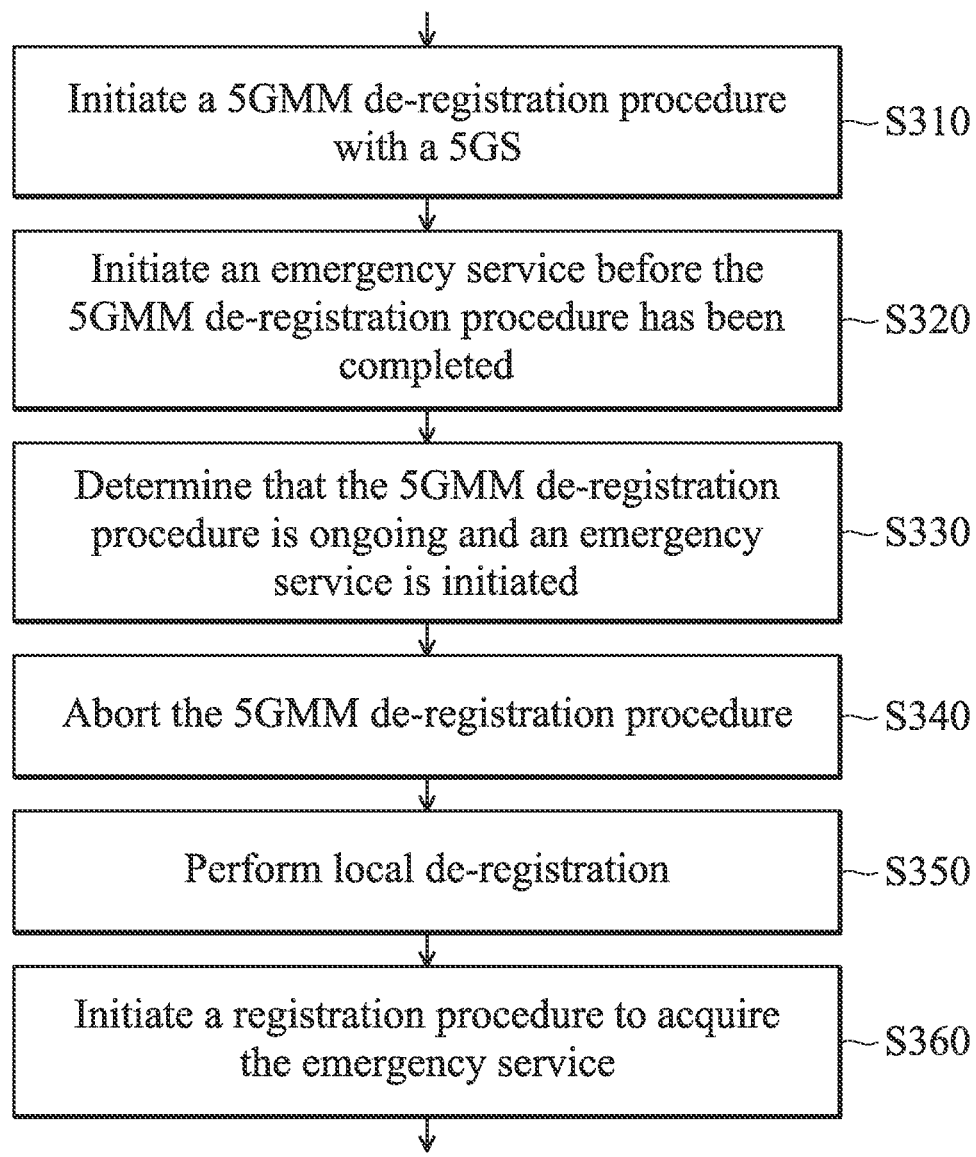
FIG. 3 is a flow chart illustrating the method for emergency call handling by a UE during a de-registration procedure according to an embodiment of the application.

FIG. 3 is a flow chart illustrating the method for emergency call handling by a UE during a de-registration procedure according to an embodiment of the application.

In step S310, a UE initiates a 5GMM de-registration procedure with a 5G System (5GS) to de-register for 5GS services when the UE is registered to the 5GS. Specifically, the 5GMM de-registration procedure is initiated not due to the UE being switched off. For example, the UE may initiate the 5GMM de-registration procedure by sending a DEREGISTRATION REQUEST message including a de-registration type Information Element (IE) which does not indicate "switch off".

In step S320, the UE initiates an emergency service before the 5GMM de-registration procedure has been completed. For example, the upper layer (e.g., the upper layer of the NAS layer) of the UE may request an emergency session establishment. The emergency service may be an emergency call which requests an emergency service fallback, or requests establishment of an emergency Protocol Data Unit (PDU) session.

In step S330, the UE determines that the 5GMM de-registration procedure is ongoing and an emergency service is initiated.

In step S340, the UE aborts the 5GMM de-registration procedure. In one example, the UE may abort the 5GMM de-registration procedure upon the determination that the 5GMM de-registration procedure is ongoing and an emergency service is initiated. In another example, the UE may start a timer (e.g., T3521) upon the initiation of the 5GMM de-registration procedure, and abort the 5GMM de-registration procedure at the expiry of the timer (i.e., not resend DEREGISTRATION REQUEST when the timer expires). Alternatively, the UE may set the counter of de-registration attempts to a value denoting that the next expiry of the timer is the fifth expiry, so that the 5GMM de-registration procedure may be aborted when the timer expires.

In step S350, the UE performs local de-registration. For example, the local de-registration may be implemented by locally releasing a Radio Resource Control (RRC) connection. In addition, the UE may further perform at least one of the following in response to the initiation of the emergency call: (1) determining a cell on which the UE is currently camping as barred; and (2) enabling the emergency service to be attempted in another mobile communication network which is an IP-Connectivity Access Network (IP-CAN) or a Circuit-Switched (CS) domain network.

In step S360, the UE initiates a registration procedure with the 5GS (or another mobile communication network) to acquire the emergency service. Specifically, the UE may initiate the registration procedure by sending a REGISTRATION REQUEST message including a 5GS registration type IE which indicates initial registration or emergency registration.

Figure 4:
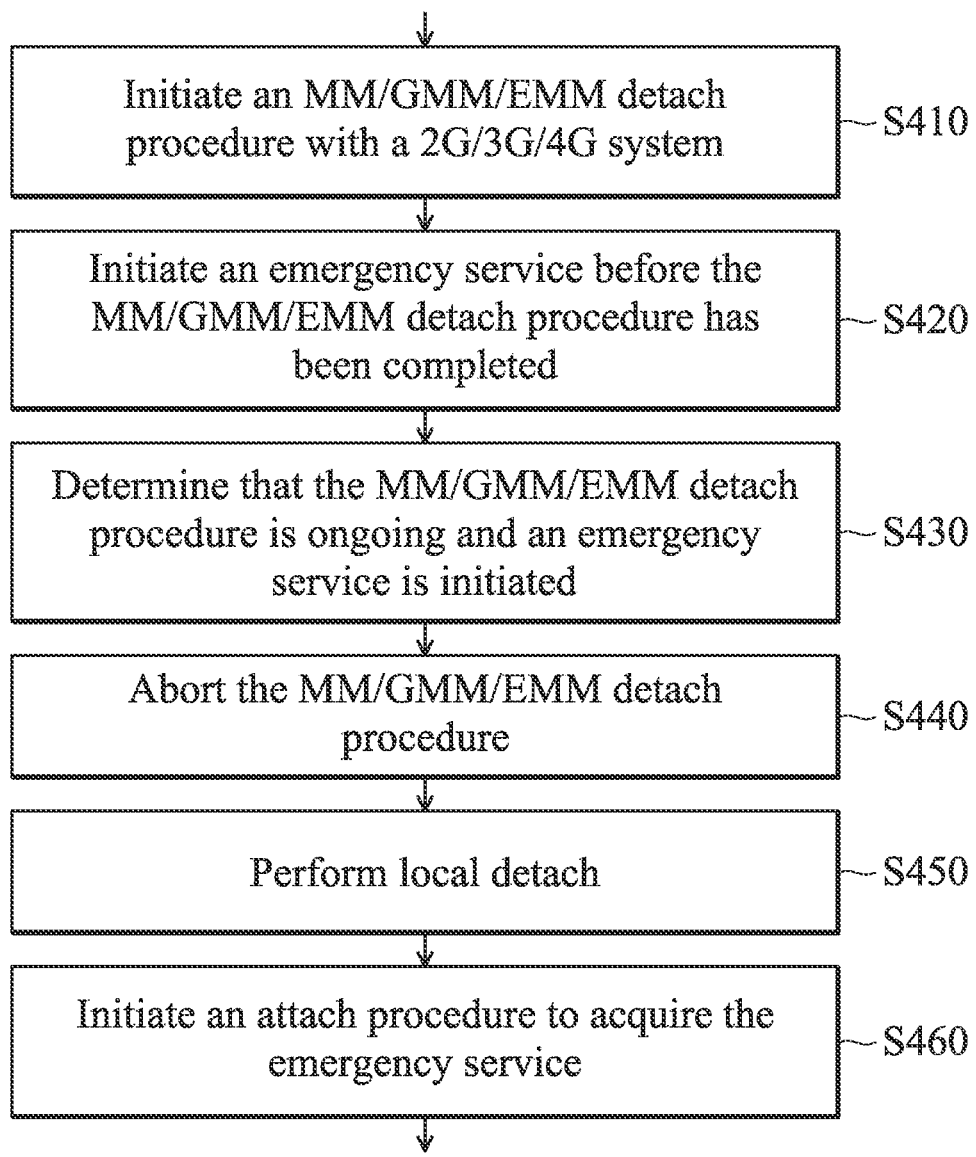
FIG. 4 is a flow chart illustrating the method for emergency call handling by a UE during a detach procedure according to an embodiment of the application.

FIG. 4 is a flow chart illustrating the method for emergency call handling by a UE during a detach procedure according to an embodiment of the application.

In step S410, a UE initiates an MM(2G)/GMM(3G)/EMM(4G) detach procedure with a 2G/3G/4G system to detach for GPRS/EPS services when the UE is registered to the 2G/3G/4G system. Specifically, the MM/GMM/EMM detach procedure is initiated not due to the UE being switched off. For example, the UE may initiate the MM/GMM/EMM detach procedure by sending a DETACH REQUEST message including a detach type IE which does not indicate "switch off".

In step S420, the UE initiates an emergency service before the MM/GMM/EMM detach procedure has been completed. For example, the upper layer (e.g., the upper layer of the NAS layer) of the UE may request an emergency session establishment. The emergency service may be an emergency call which requests an emergency service fallback (in 5GS) or a Circuit Switched Fallback (CSFB) (in EPS), or requests establishment of an emergency Packet Data Network (PDN) connection.

In step S430, the UE determines that the MM/GMM/EMM detach procedure is ongoing and an emergency service is initiated.

In step S440, the UE aborts the MM/GMM/EMM detach procedure. In one example, the UE may abort the MM/GMM/EMM detach procedure upon the determination that the MM/GMM/EMM detach is ongoing and an emergency service is initiated. In another example, the UE may start a timer (e.g., T3321 or T3421) upon the initiation of the MM/GMM/EMM detach procedure, and abort the MM/GMM/EMM detach procedure at the expiry of the timer (i.e., not resend DETACH REQUEST when the timer expires). Alternatively, the UE may set the counter of detach attempts to a value denoting that the next expiry of the timer is the fifth expiry, so that the MM/GMM/EMM detach procedure may be aborted when the timer expires.

In step S450, the UE performs local detach. For example, the local detach may be implemented by locally releasing a Radio Resource (RR) connection (for 2G) or a Radio Resource Control (RRC) connection (for 3G/4G). In addition, the UE may further perform at least one of the following in response to the initiation of the emergency call:

(1) determining a cell on which the UE is currently camping as barred; and (2) enabling the emergency service to be attempted in another mobile communication network which is an IP-CAN or a CS domain network.

In step S460, the UE initiates an attach procedure with the 2G/3G/4G system (or another mobile communication network) to acquire the emergency service. Specifically, the UE may initiate the registration procedure by sending an ATTACH REQUEST message including an attach type IE which indicates GPRS attach, combined GPRS/IMSI attach, or emergency attach, or including an EPS attach type IE which indicates EPS attach, combined EPS/IMSI attach, or EPS emergency attach.

Figure 5:
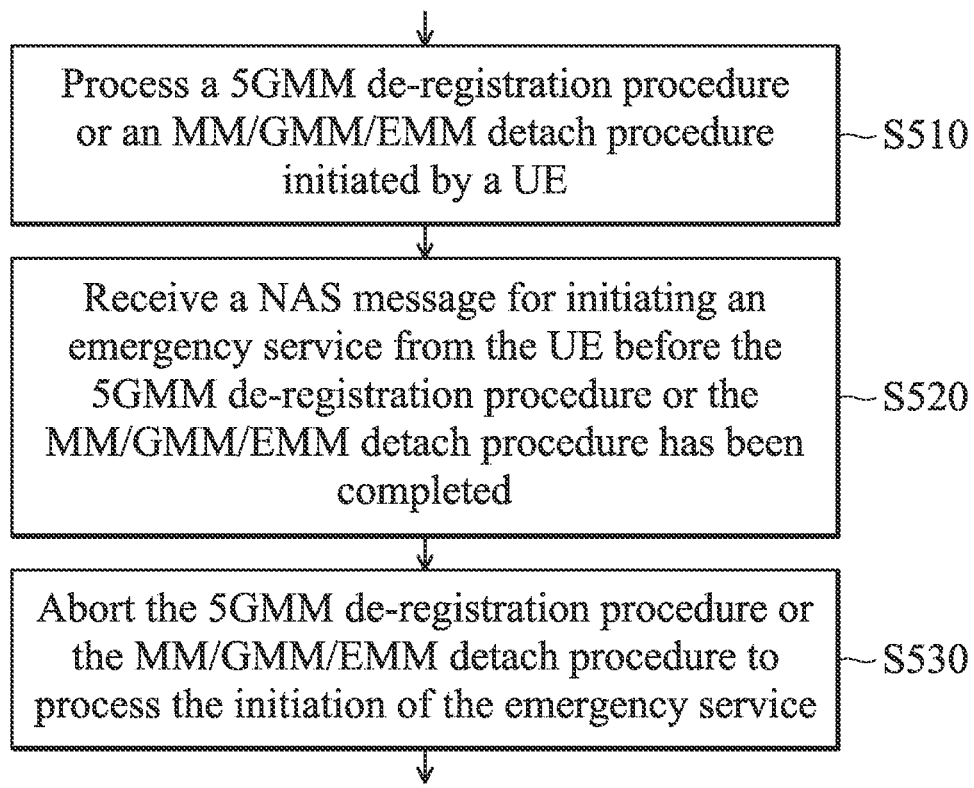
FIG. 5 is a flow chart illustrating the method for emergency call handling by a mobile communication network during a de-registration or detach procedure according to an embodiment of the application.

FIG. 5 is a flow chart illustrating the method for emergency call handling by a mobile communication network during a de-registration or detach procedure according to an embodiment of the application.

In this embodiment, the mobile communication network may be a 5GS or a 2G/3G/4G system, depending on the RAT in use.

In step S510, the mobile communication network processes a 5GMM de-registration procedure or an MM/GMM/EMM detach procedure initiated by a UE. Specifically, the 5GMM de-registration procedure or the MM/GMM/EMM detach procedure is initiated not due to the UE being switched off. In one example, during the 5GMM de-registration procedure, the mobile communication network may receive a DEREGISTRATION REQUEST message from the UE, which includes a de-registration type IE which does not indicate "switch off". In another example, during the MM/GMM/EMM detach procedure, the mobile communication network may receive a DETACH REQUEST message from the UE, which includes a detach type IE which does not indicate "switch off".

In step S520, the mobile communication network receives a NAS message for initiating an emergency service from the UE before the 5GMM de-registration procedure or the MM/GMM/EMM detach procedure has been completed. In one example, the NAS message is a REGISTRATION REQUEST message (of a registration procedure) including a 5GS registration type IE which indicates initial registration or emergency registration. In another example, the NAS message is an ATTACH REQUEST message (of an attach procedure) including an attach type IE which indicates GPRS attach, combined GPRS/IMSI attach, or emergency attach, or including an EPS attach type IE which indicates EPS attach, combined EPS/IMSI attach, or EPS emergency attach.

In step S530, the mobile communication network aborts the 5GMM de-registration procedure or the MM/GMM/EMM detach procedure to process the initiation of the emergency service (i.e., to process the registration procedure or the attach procedure).

It should be understood that the 5GMM de-registration procedure and the MM/GMM/EMM detach procedure described in FIGS. 3~5 are for illustrative purposes only and are not intended to limit the scope of the application. For example, the method of the present application may be applied to a future evolution of the 5GS, such as 6GS, and 7GS, etc.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A method, executed by a User Equipment (UE), comprising:
    initiating a Mobility Management (MM) de-registration procedure or an MM detach procedure with a mobile communication network;
    initiating an emergency call before the MM de-registration procedure or the MM detach procedure has been completed;
    aborting the MM de-registration procedure or the MM detach procedure and performing local de-registration or local detach in response to the initiation of the emergency call; and
    initiating a registration procedure or an attach procedure after the local de-registration or the local detach;
    wherein the emergency call requests an emergency service fallback or a Circuit Switched Fallback (CSFB), or requests establishment of an emergency Protocol Data Unit (PDU) session or an emergency Packet Data Network (PDN) connection;
    wherein the method further comprises:
    starting a timer upon the initiation of the MM de-registration procedure or the MM detach procedure;
    wherein the emergency call is initiated when the timer is running, and the abortion of the MM de-registration procedure or the MM detach procedure is performed.

2. The method as claimed in claim 1, wherein the MM de-registration procedure or the MM detach procedure is initiated not due to the UE being switched off.

3. The method as claimed in claim 1, wherein the local de-registration or the local detach comprises: locally releasing a Radio Resource Control (RRC) connection or a Radio Resource (RR) connection.

4. The method as claimed in claim 1, further comprising at least one of the following in response to the initiation of the emergency call:
    determining a cell on which the UE is currently camping as barred; and
    enabling the emergency call to be attempted in another mobile communication network which is an IP-Connectivity Access Network (IP-CAN) or a Circuit-Switched (CS) domain network.

5. The method as claimed in claim 1, further comprising:
    setting a counter of de-registration attempts to a value denoting that the next expiry of the timer is the fifth expiry.

6. The method as claimed in claim 1, wherein the timer is a timer T3521 in response to the mobile communication network being a 5GS, or is a timer T3421 in response to the mobile communication network being an EPS, or is a timer T3321 in response to the mobile communication network being a 2G/3G system.

7. The method as claimed in claim 1, wherein the MM de-registration procedure is initiated in response to the mobile communication network being a 5GS.

8. The method as claimed in claim 1, wherein the MM detach procedure is initiated in response to the mobile communication network being a 2G, 3G, or 4G system.

9. A User Equipment (UE), comprising:
    a wireless transceiver, configured to perform wireless transmission and reception to and from a mobile communication network; and
    a controller, configured to initiate a Mobility Management (MM) de-registration procedure or an MM detach procedure with the mobile communication network, initiate an emergency call before the MM de-registration procedure or the MM detach procedure has been completed, abort the MM de-registration procedure or the MM detach procedure and perform local de-registration or local detach in response to the initiation of the emergency call, and initiate a registration procedure or an attach procedure after the local de-registration or the local detach;

wherein the emergency call requests an emergency service fallback or a Circuit Switched Fallback (CSFB), or requests establishment of an emergency Protocol Data Unit (PDU) session or an emergency Packet Data Network (PDN) connection;

wherein the controller is further configured to start a timer upon the initiation of the MM de-registration procedure or the MM detach procedure; wherein the emergency call is initiated when the timer is running, and the abortion of the MM de-registration procedure or the MM detach procedure is performed.

10. The UE as claimed in claim 9, wherein the controller is further configured to perform at least one of the following in response to the initiation of the emergency call:

determining a cell on which the UE is currently camping as barred; and enabling the emergency call to be attempted in another mobile communication network which is an IP-Connectivity Access Network (IP-CAN) or a Circuit-Switched (CS) domain network.

11. The UE as claimed in claim 9, wherein the controller is further configured to set a counter of de-registration attempts to a value denoting that the next expiry of the timer is the fifth expiry.

12. A method, executed by a User Equipment (UE), comprising:

initiating a Mobility Management (MM) de-registration procedure or an MM detach procedure with a mobile communication network;

initiating an emergency call before the MM de-registration procedure or the MM detach procedure has been completed;

aborting the MM de-registration procedure or the MM detach procedure and performing local de-registration or local detach in response to the initiation of the emergency call; and initiating a registration procedure or an attach procedure after the local de-registration or the local detach;

wherein the emergency call requests an emergency service fallback or a Circuit Switched Fallback (CSFB), or requests establishment of an emergency Protocol Data Unit (PDU) session or an emergency Packet Data Network (PDN) connection;

wherein the method further comprises:

starting a timer upon the initiation of the MM de-registration procedure or the MM detach procedure;

wherein the emergency call is initiated when the timer is running, and performing the abortion of the MM de-registration procedure or the MM detach procedure in response to initiating the emergency call.

13. The method as claimed in claim 12, wherein the MM de-registration procedure or the MM detach procedure is initiated not due to the UE being switched off.

14. The method as claimed in claim 12, wherein the local de-registration or the local detach comprises: locally releasing a Radio Resource Control (RRC) connection or a Radio Resource (RR) connection.

15. The method as claimed in claim 12, further comprising at least one of the following in response to the initiation of the emergency call:

determining a cell on which the UE is currently camping as barred; and enabling the emergency call to be attempted in another mobile communication network which is an IP-Connectivity Access Network (IP-CAN) or a Circuit-Switched (CS) domain network.

16. The method as claimed in claim 12, further comprising:

setting a counter of de-registration attempts to a value denoting that the next expiry of the timer is the fifth expiry.

17. The method as claimed in claim 12, wherein the timer is a timer T3521 in response to the mobile communication network being a 5GS, or is a timer T3421 in response to the mobile communication network being an EPS, or is a timer T3321 in response to the mobile communication network being a 2G/3G.

* * * * *